Sept. 10, 1968 R. BARAINSKY 3,400,428
METHOD OF AND APPARATUS FOR EXTRUDING HIGH-VISCOUS
THERMOPLASTIC PLASTICS MATERIALS
Filed July 1, 1964
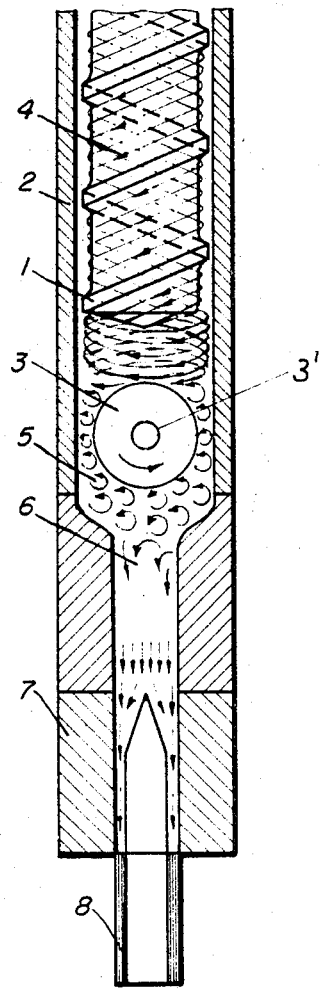
Inventor:
Rudolf Barainsky
By
Watson, Cole, Grindle & Watson
Attys.

United States Patent Office 3,400,428
Patented Sept. 10, 1968

3,400,428
METHOD OF AND APPARATUS FOR EXTRUDING HIGH-VISCOUS THERMOPLASTIC PLASTICS MATERIALS
Rudolf Barainsky, Bergisch-Gladbach, Germany, assignor to Firma Dyna-Plastik-Werk G.m.b.H., Bergisch, Germany
Filed July 1, 1964, Ser. No. 379,507
Claims priority, application Germany, July 4, 1963, D 41,906
2 Claims. (Cl. 18—12)

ABSTRACT OF THE DISCLOSURE

An extrusion apparatus for viscous and thermoplastic materials having a cylindrical casing with a screw-shaped conveyor element therein rotatably mounted in the casing and rotating coaxially therewith. The casing terminates in a space leading to a nozzle for the material, and a rotatable body is mounted on an axis which is at right angles relative to the longitudinal axis of the conveyor element. This movable body homogenizes the material in the space in the casing.

---

This invention relates primarily to a method of an apparatus for extruding highly-viscous thermoplastic plastics materials, preferably by using a screw-shaped conveying element.

The idea on which the invention is based is to subject the plastics material to an additional treatment, apart from the kneading effected by a screw-type press, with the object of obtaining finished parts having uniform physical properties. The invention consists fundamentally in that the laminar structure of the material leaving the screw-shaped conveying element is destroyed and the conveying section of the screw-type press is followed by a zone in which the plastics material is set in turbulent motion and at the same time a change is brought about in the direction of the spiral flow.

Surprisingly, after this intensive working-up process, a clear, fundamental and constantly reproducible improvement of the physical values of the finished parts shows itself. This improvement of the physical values can be traced partly to a complete homogenisation of the plastics material as regards distribution of colouring matter and other particles and the complete disintegration of the base material of the plastic itself, and partly to a decrease in the geometrical orientation of the material and thereby in the internal stresses thereof, which is revealed by the reduction of the shrinkage of the material.

In the method according to the invention, it is not necessary to stress the material highly in a mechanical or thermal respect. Even those extrusion temperatures which, in a conventional extrusion method, always result in finished products of low grade as regards their physical values allow far superior physical values to be obtained in the method according to the invention.

The result of this phenomenon is that, in contrast to what has been experienced heretofore in conventional extrusion methods, the shaping nozzle tool of the extrusion press may advantageously have a low counter-pressure, because, when the method of the invention is employed, a fresh harmful orientation of the material is avoided and the throughput increased and, in addition, the material requires far lower pressures for the welding together thereof, after it has flowed round the webs of the mandrel of the nozzle, than in the case of other methods.

The above-mentioned turbulence of the plastics material can be initiated by the most diverse means. Thus, for example, a rotary body in the form of a ball or cylinder may be used which moves transversely of the axis of the extruder cylinder, the ball or cylinder setting the material into the desired turbulent motion across its entire cross-section when the surface of the rotary body is given, with respect to the surface of the cylinder, a suitable speed dependent on the width of the gap between the surface of the rotary member and the surface of the extruder cylinder and the viscosity of the material. For example, for plasticiser-free suspension PVC having a K value=64 at a material temperature of 183° C., a gap width of 1.8 mm. and a speed of 7.5 m./min. of the surface of the rotary body with respect to the surface of the extrusion cylinder formed as a chamber have been found to be suitable.

Instead of a rotary body, it is also possible to employ an oscillating body or a body performing vibrating oscillations. In addition, a plurality of bodies may be arranged one behind the other or side-by-side. Likewise, the turbulence can also be increased by furnishing the or each body with ribs or other suitable formations.

By way of example only, an embodiment of the invention will now be described in greater detail with reference to the accompanying drawing which shows a single figure as a longitudinal section of a portion of an extruder cylinder.

The extruder has a screw-shaped conveying element 1 contained in an extruder cylinder or casing 2. Below the screw-shaped conveying element 2, there is shown a rotary body in the form of a ball 3, which rotates steadily about a pin 3'. The steady rotary movement can be replaced under certain circumstances by a reciprocating movement of the body.

The plastics material is carried forward in a spiral direction of flow following the arrows 4 and leaves the conveying element 1 with a predominantly laminar flow. The turbulence of the material obtained by means of the rotary body and the change in the direction of twist are indicated by the arrows 5. In the bore 6 leading to the nozzle tool of the cylinder, there is again produced a laminar flow of the plastics material, which flow is kept as short as possible and under low pressure, so that a finished product 8 having first-class physical properties is obtained.

The invention is described here with reference to a vertical extruder cylinder, but the invention can also be incorporated into a machine with a horizontal arrangement of the extruder cylinder with the same advantageous results.

The form and number of sectional gaps between the body and the inner surface of the extrusion cylinder can be varied by suitable shaping of the rotary body and by the arrangement of a plurality of members one behind the other or side-by-side.

I claim:
1. Extrusion apparatus for extruding thermoplastic comprising an extrusion cylinder, means in said cylinder for imparting to the material to be extruded a laminar spirally-directed flow, an extrusion nozzle connected to the extrusion cylinder and located in said cylinder between said means and said nozzle and a ball rotatably mounted about an axis at right angles to the axis of the cylinder.

2. An extrusion apparatus for viscous and thermoplastic materials comprising a cylindrical casing, a screw-shaped conveying element rotatably mounted in the casing, said casing terminating in a bore leading to a nozzle for the material, and a movable body mounted on an axis which is at right angles relative to a longitudinal axis of the conveying element, said body being provided in the casing in a space between an end of the conveying element and the bore leading to the nozzle, said movable body homogenizing the material in the said space, and the body being in the form of a ball.

References Cited

UNITED STATES PATENTS

| | | |
|---|---|---|
| 2,683,895 | 7/1954 | Scofield. |
| 2,723,422 | 11/1955 | Marshall. |
| 2,767,437 | 10/1956 | Marshall. |
| 2,488,129 | 11/1949 | Landa. |
| 2,705,131 | 3/1955 | Ross et al. _____ 18—12 X |
| 3,031,731 | 1/1962 | Bruckner _____ 18—12 X |
| 3,035,303 | 5/1962 | Stanley _____ 18—12 |
| 3,256,561 | 6/1966 | Rodenacker _____ 18—12 |
| 3,275,731 | 9/1966 | Kosinsky _____ 18—12 X |

FOREIGN PATENTS 1,150,253  1/1958  France.

WILLIAM J. STEPHENSON, *Primary Examiner.*